(12) United States Patent
Mathur

(10) Patent No.: US 7,267,196 B2
(45) Date of Patent: Sep. 11, 2007

(54) METHOD AND APPARATUS FOR REDUCING ACOUSTIC NOISE

(75) Inventor: Gopal P. Mathur, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 10/777,818

(22) Filed: Feb. 12, 2004

(65) Prior Publication Data

US 2005/0189165 A1   Sep. 1, 2005

(51) Int. Cl.
*F16F 15/00* (2006.01)
*F16F 7/00* (2006.01)

(52) U.S. Cl. ............... 181/208; 181/198; 181/200; 181/207

(58) Field of Classification Search ......... 181/207–209
See application file for complete search history.

(56) References Cited

U.S. PATENT DOCUMENTS

| | | | | |
|---|---|---|---|---|
| 1,867,549 | A * | 7/1932 | Brockmeyer | 181/290 |
| 2,043,416 | A * | 6/1936 | Lueg | 181/207 |
| 4,317,503 | A * | 3/1982 | Soderquist et al. | 181/290 |
| 5,631,451 | A * | 5/1997 | Torisaka et al. | 181/207 |
| 5,905,234 | A * | 5/1999 | Tsukamoto et al. | 181/286 |
| 6,053,275 | A * | 4/2000 | Leonetti et al. | 181/200 |
| 6,638,640 | B2 * | 10/2003 | Jee | 181/208 |
| 6,789,645 | B1 * | 9/2004 | Deblander | 181/290 |
| 2002/0070074 | A1 * | 6/2002 | Bongiovi | 181/207 |
| 2002/0108807 | A1 * | 8/2002 | Murakami et al. | 181/204 |
| 2005/0039976 | A1 * | 2/2005 | Vu | 181/209 |
| 2005/0051381 | A1 * | 3/2005 | Imai | 181/207 |
| 2006/0037809 | A1 * | 2/2006 | Fuller et al. | 181/207 |

FOREIGN PATENT DOCUMENTS

| | | |
|---|---|---|
| GB | 2088027 A * | 6/1982 |
| JP | 54140527 A * | 10/1979 |

OTHER PUBLICATIONS

Yao-Joe Yang, Marc-Alexic Gretillat and Stephen D. Senturia; "Effect of Air Dampening on the Dynamics of Non-Uniform Deformations of Micro-Structures", 1997 IEEE International Conference on Solid-State Sensors and Actuators, TRANSDUCERS 1997, 5 pgs.

Yao-Joe Yang and Stephen D. Senturia; "Numerical Simulation of Compressible Squeezed-Film Damping", Tech. Digest, Solid State Sensor and Actuator Workshop Hilton Head, SC, Jun. 1996, 5 pages.

Minhang Bao, Heng Yang and Yuancheng Sun; "A Modified Reynolds' Equation for Squeeze-Film Air Damping of Hole-Plate"; 4 pages.

* cited by examiner

*Primary Examiner*—Lincoln Donovan
*Assistant Examiner*—Eduardo Colon
(74) *Attorney, Agent, or Firm*—Wildman, Harrold, Allen & Dixon, LLP

(57) ABSTRACT

A squeeze film damper reduces acoustic wave transmission by the damping and spring forces produced by squeezing a very thin layer of air trapped between two vibrating plates. The damping effect is most pronounced when the gap between vibrating plates is very small, e.g., of the order of micrometers, thus, the squeeze film dampers have two, very closely-spaced opposing plates, the top of which vibrates out-of-phase with respect to the lower plate, when the lower plate is attached to a vibrating surface. The relative motion of plates squeezes out the thin film of air trapped within the plates and adds substantial amount of passive damping over a wideband of frequency to the base vibrating structure thereby reducing vibrations and noise radiated by the structure. The out-of-phase displacement of the top plate, with respect to the bottom plate, tends to cancel acoustic energy imparted to the lower plate by a vibrating surface. Squeeze film dampers can be applied in arrays to a vibrating surface.

11 Claims, 4 Drawing Sheets

METHOD AND APPARATUS FOR REDUCING ACOUSTIC NOISE

FIELD OF THE INVENTION

This invention relates to methods and apparatus to reduce acoustic noise radiation and transmission. In particular, this invention relates to methods and apparatus to reduce acoustic noise radiated/transmitted by vibrating surfaces.

BACKGROUND OF THE INVENTION

Acoustic noise suppression in automotive and aerospace vehicles usually requires noise abatement materials and designs that add costs and weight. Some prior art noise suppression techniques reduce vibrations by adding structural reinforcements. Other prior art techniques reduce noise transmission by adding acoustically absorptive and/or damping materials.

A problem with structural reinforcements is the weight they add to a transportation vehicle. A problem with prior art noise absorption techniques is the volume of space as well as the weight that they too add to a vehicle. A need therefore exists for a method and apparatus to reduce acoustic noise transmission while reducing weight that is added to reduce noise but also to minimize the space consumed by noise abating materials.

SUMMARY OF THE INVENTION

A method and apparatus for reducing the transmission of acoustic noise employs a device referred to herein as a squeeze film damper, which is mounted to a vibrating surface. The squeeze film damper is similar to prior art micro electromechanical system or "MEMS" but without internal electronics. The squeeze film damper encloses a very thin layer of air between two opposing plates. When the squeeze film damper is attached to a vibrating surface, it is subjected to vibration forces that are parallel to the normal to the plate surfaces. As the plate attached to a vibrating surface moves in response to vibration, the opposing plate deflects towards the plate attached to the vibrating surface. This relative motion of plates squeezes out the thin film of air trapped within the plates and adds substantial amount of passive damping over a wideband of frequency to the base vibrating structure thereby reducing vibrations and noise radiated by the structure. The movement of the two opposing plates is also out of phase with respect to each other. The out-of-phase movement of the top plate tends to cancel noise waves transferred through the vibrating surface. In a typical configuration of the squeeze film damper, one plate is usually suspended over the other plate trapping a very thin layer of air between plates. The trapped air between the two plates, behaving as a compressible fluid, is squeezed in (and out) when one or both of the plates vibrate.

An array of squeeze film dampers applied across vibrating surfaces in an aircraft, vehicle, or structure reduces the transmission of broadband noise by the vibrating surface. If the squeeze film dampers are enclosed in a foam structure, additional vibration damping can be realized.

DETAILED DESCRIPTION OF THE PREFERRED EMBODIMENTS

Figure 1:
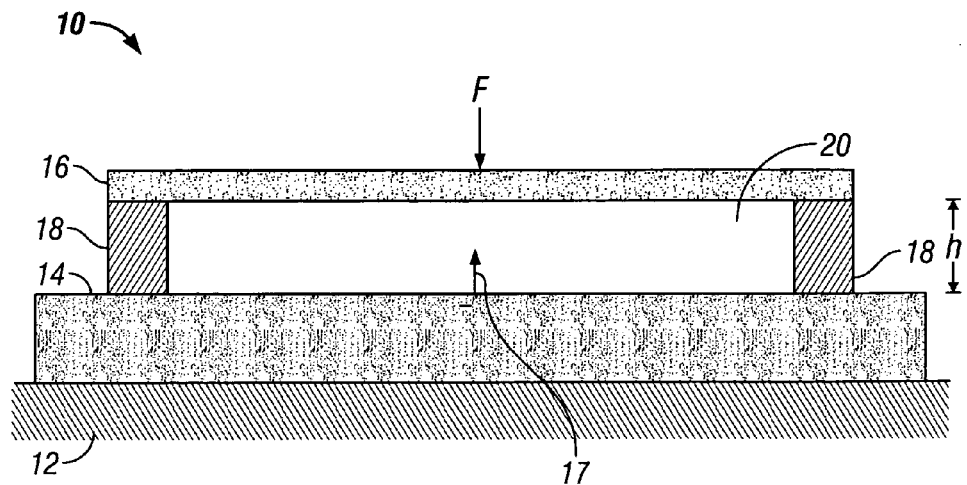
FIG. 1 shows a cross-sectional view of an apparatus for reducing the acoustic radiation/transmission of noise by a vibrating surface.

FIG. 1 shows a cross-sectional view of an apparatus for reducing the acoustic radiation/transmission of noise by a vibrating surface. In FIG. 1, reference numeral 12 identifies a surface, such as the interior wall of an aircraft, motor vehicle, or a building, which is capable of vibrating at frequencies at which acoustic waves are generated. It is well known that such frequencies extend from just over zero hertz up through 20 kilohertz and higher, depending upon response of the eardrum of the listener.

A squeeze film noise damper 10, referred to hereinafter as a "squeeze film damper" 10 is coupled to the surface 12 so that surface vibrations are absorbed by the squeeze film damper 10 instead of being transmitted into the volume above the surface 12. The squeeze film damper can be attached to the surface 12 by any adhesive that will propagate vibrations of the surface 12 into the squeeze film damper 10.

The squeeze film damper 10 is made up of a substantially planar base 14, depicted in cross-section FIG. 1. A relatively flexible cover 16 is supported above the base 14 by a support structure 18 such that the base 14, cover 16 and support structure 18 encloses air or other gas within a volume 20. As shown in FIG. 1, the top of the base 14 and the bottom of the cover 16 are separated by a relatively small distance denoted as "h" in FIG. 1. In most embodiments, "h" is measured in micrometers and typically at least one micrometer.

Figure 2:
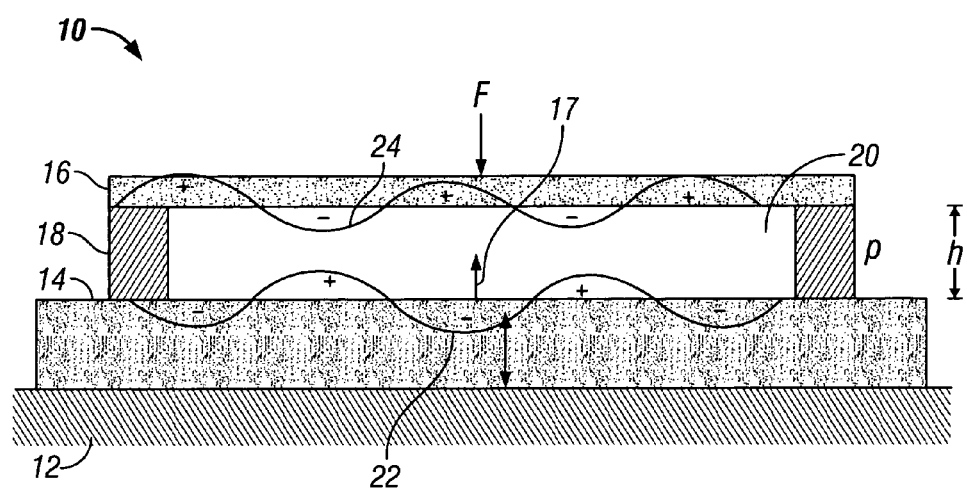
FIG. 2 depicts relative motion of two plates in a squeeze film damper.

FIG. 2 depicts the relative movement of the base 14 and the cover 16 with respect to each other when the squeeze film damper 10 is subjected to acoustic waves transmitted through the surface 12. When one or both plates 14, 16 move with respect to each other, the trapped air (or other gas), behaving as a compressible fluid between two plates is squeezed in (or out) between the plates 14, 16 thereby adding significant damping to the base plate 16. Also, an upward acceleration 17 by the base 14 will cause the cover 16 to deflect downward in the direction indicated by the vector F.

The lower sinusoidal wave form 22 depicts the displacement of the base 14 in response to acoustic waves transmitted through the surface 12 into the base 14. As shown in the figure, when the base 14 moves in one direction, as depicted by the sinusoidal wave form 22, the cover 16 will "move" in an opposite direction. Stated alternatively, the deflection of the base 14 caused by vibration of the surface 12 causes an out-of-phase deflection of the cover 16. The result of these two phenomena is to suppress or dampen noise transmission by the squeeze film damper 10. If arrays of squeeze film dampers 10 are applied over the interior surface of a vibrating panel or wall, they can act to dampen the transmission of vibration through the walls and reduce noise transmitted through the base structure 14.

In one embodiment, the squeeze film damper 10 has a substantially rectangular planar base, above which is a mating rectangular cover. In such an embodiment, the support structure 18 is preferably comprised of a foundation wall the height of which maintains the cover at a uniform height across the base by the distance "h." In an alternate embodiment, the base 14 can be circular, the cover circular and the support structure an annulus. In such an alternate embodiment the enclosed volume would be a section of a cylinder. In yet other embodiments, the base 14 and cover 16 can be square, triangular or elliptical.

Figure 3A:
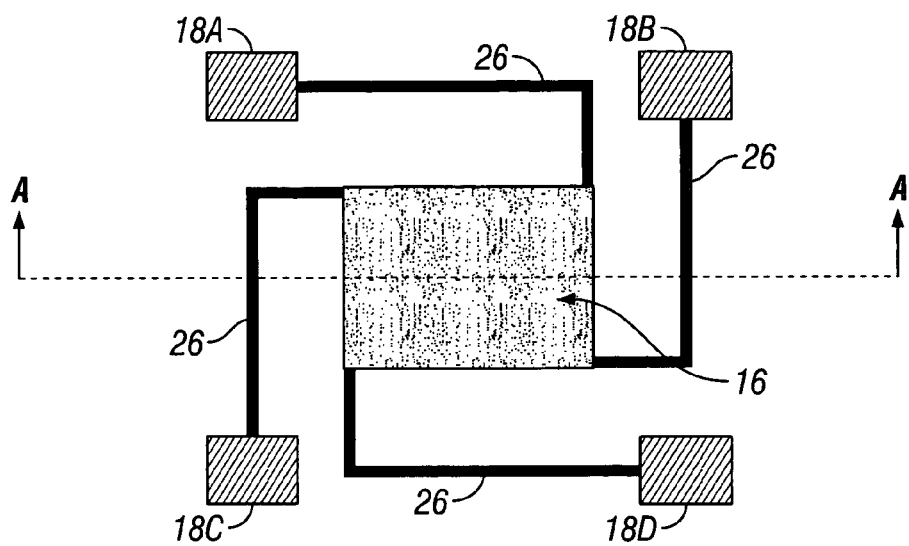
FIG. 3A shows the top view of an embodiment of a squeeze film damper.
Figure 3B:
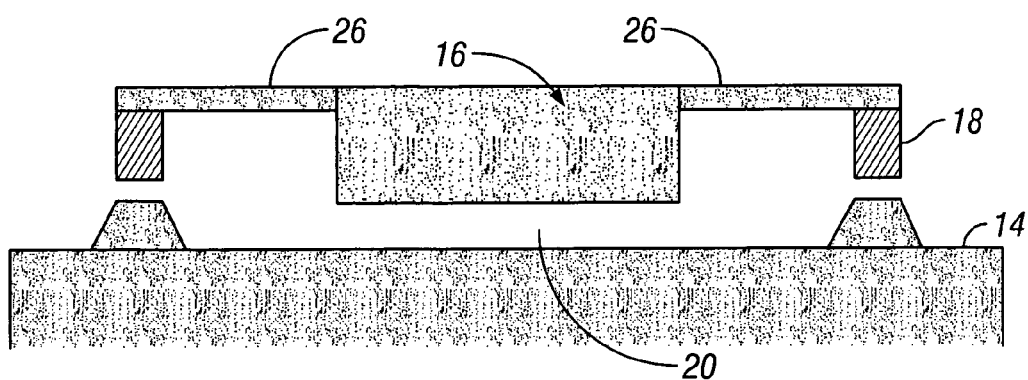
FIG. 3B shows a side view of the embodiment shown in FIG. 3A.

FIG. 3A shows the top view of an alternate embodiment of a squeeze film damper 10. FIG. 3B shows a side view of the embodiment shown in FIG. 3A taken along section lines A-A.

In FIG. 3A, four support structures 18A-18D support the cover 16 through 4 torsion bars or tether arms identified by reference numeral 26 in FIG. 3A and FIG. 3B. Inasmuch as these tether arms 26 do not completely cover the volume or space 20 below the cover 16, the volume below the cover 16 and above the base 14 is not airtight. Nevertheless, the pliability of the tether arms 26 provides an improved vibratory response of the cover 16 to certain vibrations transmitted into the tether through the support structures 18A-18D.

Figure 4:
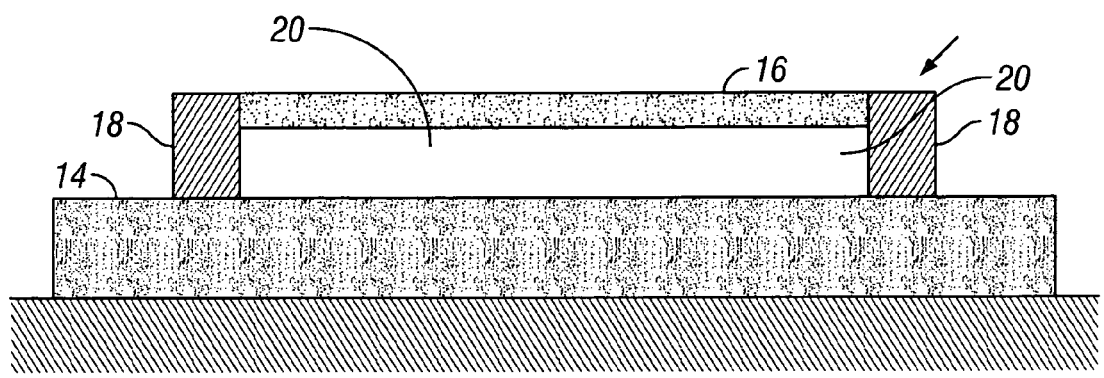
FIG. 4 shows an alternate embodiment of a squeeze film damper.

FIG. 4 shows yet another alternate embodiment of the squeeze film damper 10. In this figure, the cover 16 does not rest atop the support structure 18 as shown in FIG. 1 but instead it extends from the support structure 18 much like a cantilever.

Those of ordinary skill in the art will recognize that the support structure 18 and the cover 16 could be integrally formed instead of being separate constituent parts. For purposes of claim construction, the cover and support structures shown in FIGS. 1-7 should be considered equivalent to each other and to an integrally formed cover 16 and support structure 18.

Figure 5:
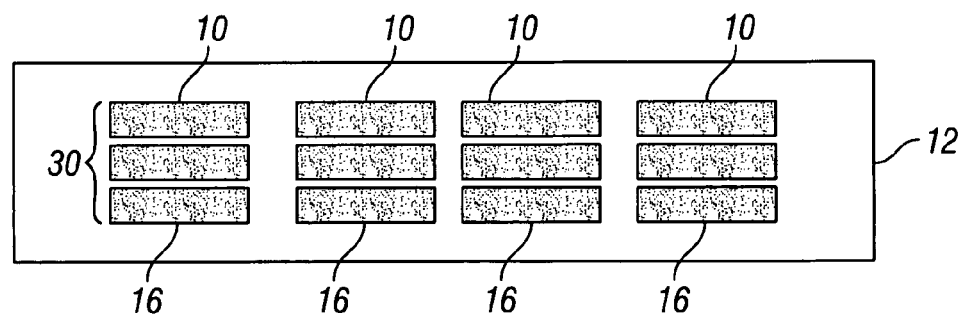
FIG. 5 shows an apparatus comprising an array of squeeze film damper for reducing noise radiation/transmission from a vibrating surface.

FIG. 5 shows an apparatus for reducing noise transmission from a vibrating surface. The apparatus is comprised of an array 30 of squeeze film dampers 10 mounted to a substrate that is coupled to a vibrating surface 12 such as the interioral wall of an aircraft, an automobile, truck, or fixed structure, such as the wall of an office or living space (none of which are shown for clarity).

As shown in FIG. 5, each of the squeeze film dampers 10 is substantially rectangular in order to maximize the coverage of a wall by squeeze film dampers 10. They are mounted in a regular repeating pattern considered herein to be an "array." Altered embodiments of an "array" would also include irregular or randomly spaced squeeze film dampers distributed across wide areas of a vibrating surface. Each of the squeeze film dampers 10 depicted in FIG. 5, is constructed in accord with the above-identified squeeze film dampers.

Figure 6:
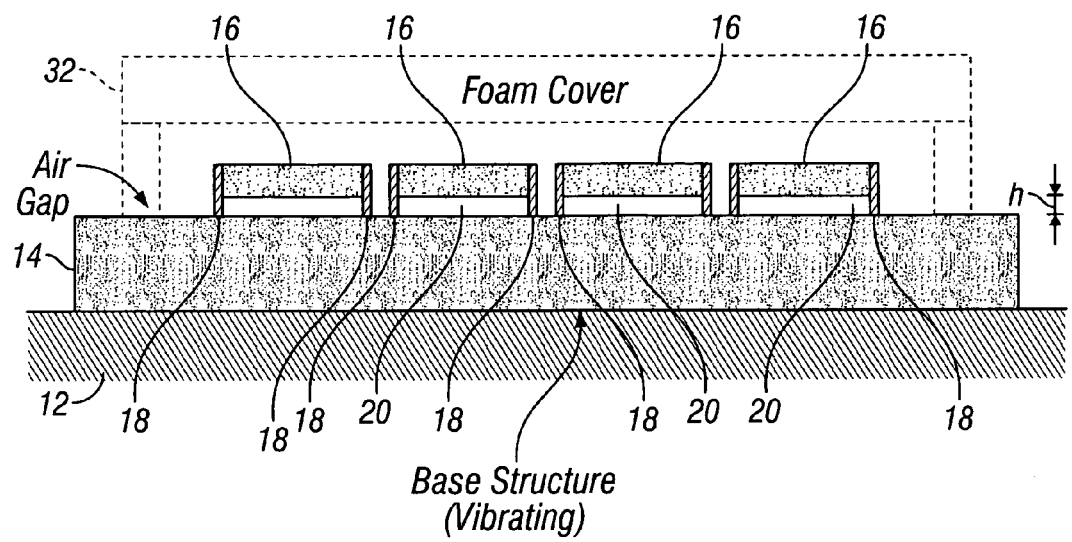
FIG. 6 shows an embodiment of an apparatus for reducing noise radiation/transmission.

FIG. 6 shows yet another embodiment of an apparatus for reducing noise transmission. In this figure, the array of squeeze film dampers is enclosed or encased by a foam cover 32. While the foam cover 32 takes up additional volume and adds additional weight, its noise-absorption capabilities dampen or absorb noise that is transmitted around the squeeze film dampers.

Figure 7:
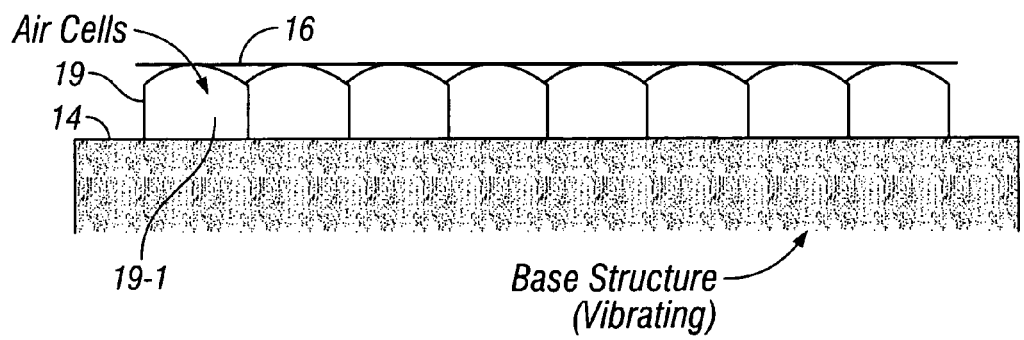
FIG. 7 shows yet another alternate embodiment of a squeeze film damper used for a noise suppression.

FIG. 7 shows yet another alternate embodiment of a squeeze film damper used for noise suppression. In FIG. 7, the base 14 and cover 16 are separated from each other by vertically oriented corrugation plates 19, which are shown in cross-section in FIG. 7. Each of the vertical walls that comprise a section 19-1 of the corrugation plate encloses an air cell. Each of the air cells respond as the enclosed volume described above response however, the vertically-oriented walls that form the corrugation plate add rigidity to the cover 16 enabling the structure to be manufactured with a much larger surface area then is otherwise possible using the squeeze film dampers 10 depicted in FIGS. 1-6.

In the preferred embodiments, the volume 20 enclosed by the cover 16, base 14, and support structures 18 is preferably filled with air. Other gases could be also be enclosed within this volume as well. Except for the alternate shapes of squeeze film dampers described above, a preferred embodiment contemplates a substantially rectangular base, support structure and cover. Rectangular-shaped squeeze film dampers enable more of the surface to be covered with such devices as opposed to a circular squeeze film damper.

The squeeze film dampers require mechanical coupling to a vibratory surface. Accordingly, consideration should be given to the method by which a squeeze film damper is attached to the surface. An appropriate, vibration-transmitting adhesive (not shown in the figures) is structure, the function of which is to attach the squeeze film damper to a surface. Such adhesives would include all those known to those of ordinary skill in the art of the subject matter claimed herein.

In light of the foregoing, it should be apparent to those of ordinary skill in the art that a method of reducing sound transmission from a vibrating surface includes the relatively straightforward steps of applying arrays of squeeze film dampers to a vibrating surface. The application of the squeeze film dampers to the vibrating surface can be made possible by appropriate adhesives such as epoxy or other vibration-transmitting adhesives. In addition, a foam cover might be placed over the squeeze film dampers to further isolate noise transmission. By using the foregoing squeeze film dampers, broadband acoustic noise can be reduced in aircraft (planes and helicopters), vehicles such as automobiles and trucks, but also buildings and other structures, simply by applying arrays of the squeeze film dampers to interior surfaces.

What is claimed is:

1. An apparatus for reducing noise transmission from a vibrating surface, said apparatus comprised of: an array of squeeze film dampers coupled to the vibrating surface, each of said squeeze film dampers being comprised of: a substantially rigid planar base, a substantially planar, flexible cover supported above the substantially rigid planar base structure by a support structure such that the substantially planar rigid base, the support structure and the cover enclose a volume, and further comprising a rigid cover over and enclosing said array of squeeze film dampers.

2. The apparatus of claim 1 wherein the rigid cover is a rigid foam cover enclosing said array of squeeze film dampers.

3. The apparatus of claim 1 wherein said volume is filled with gas.

4. The apparatus of claim 1 wherein said substantially rigid planar base is substantially round.

5. The apparatus of claim 1 wherein said substantially rigid planar base is substantially rectangular.

6. The apparatus of claim 1 wherein said support structure is comprised of a plurality of separate support structures placed about the perimeter of said substantially rigid planar base.

7. A method reducing sound transmission from a vibrating surface, said method comprising: applying an array of squeeze film dampers to the vibrating surface, each of said squeeze film dampers being comprised of: a substantially rigid planar base, a substantially planar, flexible cover supported above the substantially rigid planar base structure by a support structure such that the substantially planar rigid base, the support structure and the cover enclose a volume; and placing a rigid cover over and enclosing said array of squeeze film dampers.

8. The method of claim 7 wherein step of applying an array of squeeze film dampers to the vibrating surface is further comprised of the step of: applying an array of squeeze film dampers to an interior surface of an airplane.

9. The method of claim 7 wherein said step of applying an array of squeeze film dampers to the vibrating surface is further comprised of the step of: applying an array of squeeze film dampers to an interior surface of a helicopter.

10. The method of claim 7 wherein said step of applying an array of squeeze film dampers to the vibrating surface is further comprised of the step of: applying an array of squeeze film dampers to an interior surface of an automobile.

11. The method of claim 7 wherein said step of applying an array of squeeze film dampers to the vibrating surface is further comprised of the step of: applying an array of squeeze film dampers to an interior surface of a structure.

* * * * *